(12) United States Patent
Wang

(10) Patent No.: US 9,491,280 B2
(45) Date of Patent: *Nov. 8, 2016

(54) PHONE

(71) Applicant: MediaTek Inc., Hsin-Chu (TW)

(72) Inventor: Ching-Chieh Wang, Luodong Township, Yilan County (TW)

(73) Assignee: MEDIATEK INC., Hsin-Chu (TW)

( * ) Notice: Subject to any disclaimer, the term of this patent is extended or adjusted under 35 U.S.C. 154(b) by 14 days.

This patent is subject to a terminal disclaimer.

(21) Appl. No.: 13/627,347

(22) Filed: Sep. 26, 2012

(65) Prior Publication Data
US 2013/0023311 A1  Jan. 24, 2013

Related U.S. Application Data

(63) Continuation of application No. 12/277,389, filed on Nov. 25, 2008, now Pat. No. 8,295,453.

(51) Int. Cl.
  *H04M 11/00* (2006.01)
  *H04M 1/725* (2006.01)
  *G06F 3/0488* (2013.01)

(52) U.S. Cl.
  CPC ...... *H04M 1/72583* (2013.01); *G06F 3/04886* (2013.01); *H04M 2250/22* (2013.01); *H04M 2250/74* (2013.01)

(58) Field of Classification Search
  CPC ......... H04M 1/27455; H04M 11/066; H04M 1/247
  USPC ............. 379/93.01–93.19, 88.14; 455/552.1, 455/563; 345/173
  See application file for complete search history.

(56) References Cited

U.S. PATENT DOCUMENTS

| 6,518,957 B1 * | 2/2003 | Lehtinen | G06F 1/1626 345/168 |
| 7,479,949 B2 * | 1/2009 | Jobs | G06F 3/0488 345/169 |
| 7,743,188 B2 * | 6/2010 | Haitani | G06F 3/023 710/62 |
| 2005/0079896 A1 | 4/2005 | Kokko et al. | |
| 2006/0009264 A1 * | 1/2006 | Seo | H04M 1/56 455/563 |
| 2006/0205432 A1 * | 9/2006 | Hawkins et al. | 455/552.1 |
| 2008/0095332 A1 * | 4/2008 | Myers | H04M 1/274516 379/88.14 |
| 2008/0129703 A1 * | 6/2008 | Takeshita et al. | 345/173 |
| 2009/0117942 A1 | 5/2009 | Boningue et al. | |
| 2009/0256809 A1 * | 10/2009 | Minor | G06F 3/03547 345/173 |

FOREIGN PATENT DOCUMENTS

| FI | GB 2353184 A * | 2/2001 | ........... G06F 1/1626 |
| WO | 2009127916 | 10/2009 | |

OTHER PUBLICATIONS

DE Office Action mailed Nov. 19, 2009.

* cited by examiner

*Primary Examiner* — Van D Huynh
(74) *Attorney, Agent, or Firm* — McClure, Qualey & Rodack, LLP

(57) ABSTRACT

A phone, comprising: a touch panel; a voice receiver; and a controller, coupled to the touch panel and the voice receiver, and operable to disable a touch function of the touch panel when the voice receiver detects a conversation.

35 Claims, 5 Drawing Sheets

PHONE

CROSS REFERENCE TO RELATED APPLICATIONS

This application is a Continuation of U.S. patent application Ser. No. 12/277,389, filed Nov. 25, 2008, now U.S. Pat. No. 8,295,453, the entirety of which is incorporated by reference herein.

BACKGROUND OF THE INVENTION

1. Field of the Invention

The invention relates to phones, and particularly relates to phones with touch panels.

2. Description of the Related Art

Multimedia mobile phone has a touch panel with virtual keyboard and buttons, but a minimum amount of hardware input. The functions of the multimedia mobile phone include those of a camera phone and portable media player in addition to text messaging and visual voice mail. The multimedia mobile phone also offers internet services including e-mail, web browsing, and local Wi-Fi connectivity.

For different functions of the multimedia mobile phone, the touch panel thereof shows different user interfaces.

BRIEF SUMMARY OF THE INVENTION

The invention provides a phone, comprising: a touch panel; a voice receiver; and a controller, coupled to the touch panel and the voice receiver, and operable to disable a touch function of the touch panel when the voice receiver detects a conversation.

In another embodiment of the invention, the phone comprises a touch panel; and a controller, operable to display a first user interface on the touch panel with a dialing icon for dialing a call, and maintain displaying the first user interface after the call is dialed.

The invention further discloses methods of controlling a touch panel of a phone. The touch panel is capable of displaying a first user interface on the touch panel. The method of the invention comprises controlling the touch panel to display a first user interface on the touch panel, wherein the first user interface includes a dialing icon for dialing a call; and controlling the touch panel to maintain displaying the first user interface after the dialing icon is tapped.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows some embodiments carrying out the invention. This description is made for the purpose of illustrating the general principles of the invention and should not be taken in a limiting sense. The scope of the invention is best determined by reference to the appended claims.

Figure 1A:
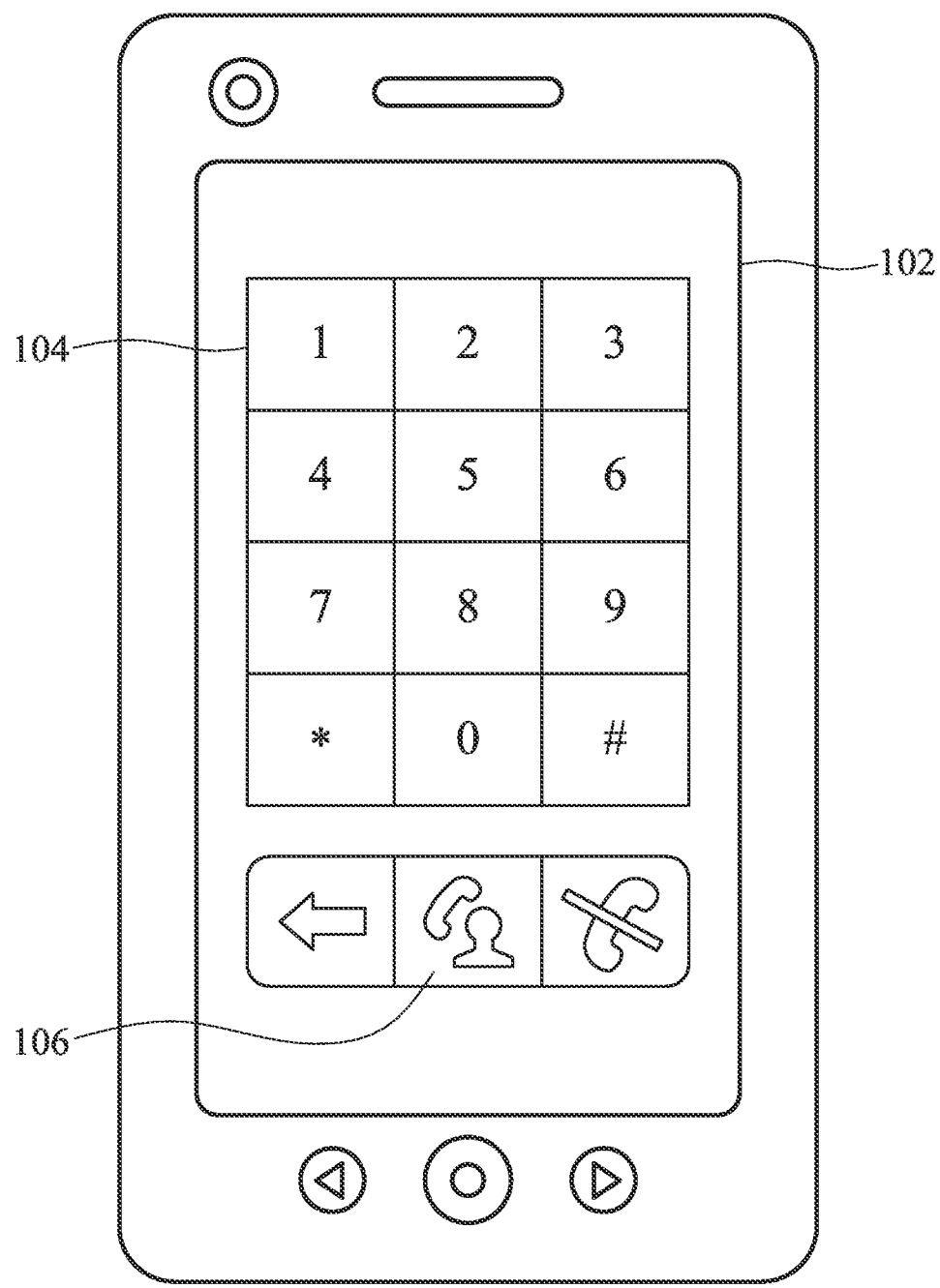
FIG. 1A illustrates a phone with a touch panel displaying a first user interface.

FIG. 1A illustrates a phone 100 with a touch panel 102, wherein the touch panel 102 shows an embodiment of a first user interface. The first user interface comprises numeric icons 104 and a dialing icon 106 for the user to dial a phone number.

Figure 1B:
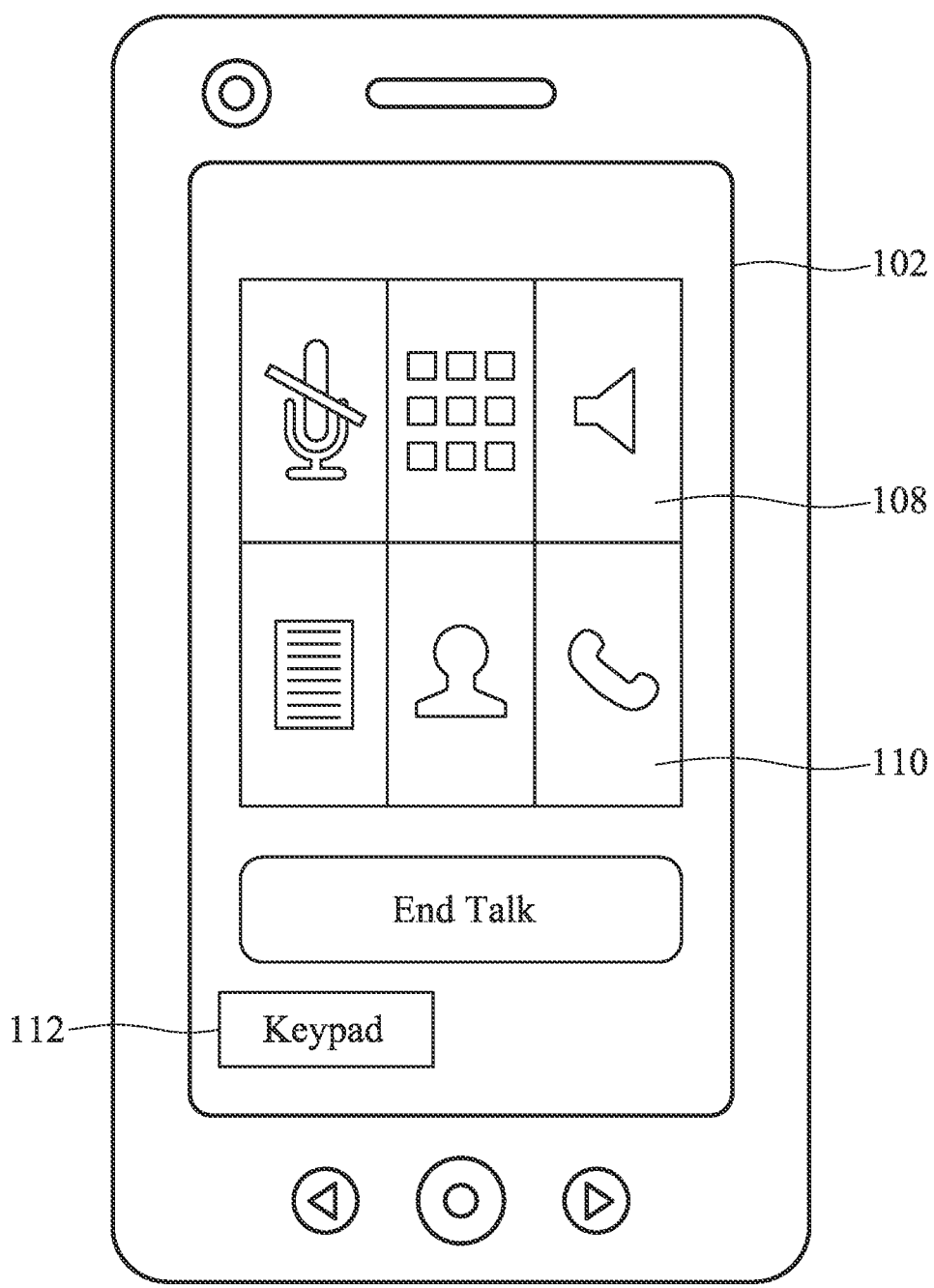
FIG. 1B illustrates a phone with a touch panel displaying a second user interface.

FIG. 1B illustrates an embodiment of a second user interface. The second user interface comprises icons for controlling the phone 100. For example, users can tap the icons of the second user interface to adjust the speaker volume (by tapping icon 108) or to hold the call (by tapping icon 110).

Figure 2:
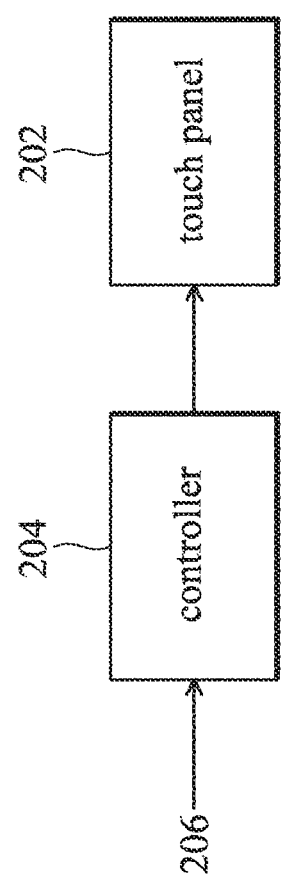
FIG. 2 illustrates an embodiment of the invention.

FIG. 2 illustrates an embodiment of the invention, which comprises a touch panel 202 and a controller 204. For dialing a phone number, the touch panel 202 may be controlled to display a first user interface, such as that shown by FIG. 1A, comprising numeric icons 104 and a dialing icon 106. After the dialing icon 106 is tapped by the user, the controller 204 maintains display of the first user interface until an interrupt signal 206 enters the controller 204. Unlike the conventional phone, wherein the user interface is switched once the dialing icon 106 is tapped, the invention controls the touch panel 202 to switch from the first user interface to a second user interface (such as that shown by FIG. 1B) according to the interrupt signal 206 which occurs later than tapping of the dialing icon 106.

The conventional phones, which may switch from the first user interface to the second user interface once the dialing icon 106 is tapped, are inconvenient to voice service systems in which the user may need the first user interface shown in FIG. 1A to dial an extension or follow the instructions from the voice service system. In these cases, the users of the conventional phones have to tap the keyboard icon 112 of the second user interface to switch the touch panel 102 to the first user interface to show the numeric icons 104.

Compared with the users of the conventional phones, the user of the invention can directly dial an extension or follow the instructions of the voice service system without switching the user interface.

Figure 3:
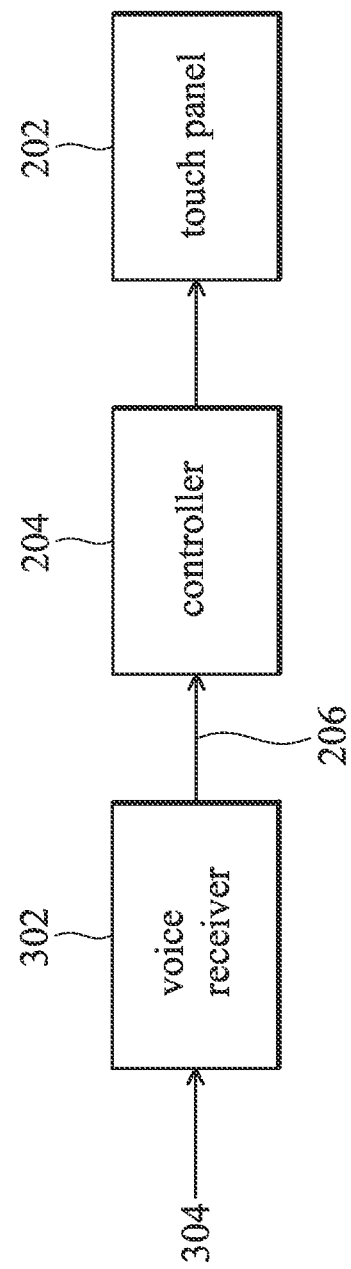
FIG. 3 illustrates another embodiment of the invention.

FIG. 3 illustrates another embodiment of the invention. Compared with the embodiment shown in FIG. 2, FIG. 3 further comprises a voice receiver 302. The voice receiver 302 is operable to receive conversation 304 from the user. In some embodiments, the interrupt signal 206 is generated when the voice receiver 302 detects that the conversation comprises a predetermined phrase, such as 'hello' or 'may I speak with' or any other phrases. Because users usually don't say the predetermined phrases while dialing an extension or using a voice service, the embodiments can maintain display of the first user interface comprising numeric icons (such as those shown by 104) under a voice service system. Thus, the user doesn't have to switch user interfaces for dialing an extension or following the instructions from the voice service system.

In another embodiment, the voice receiver 302 may generate the interrupt signal 206 after the conversation 304 has been received for a period of time. In another embodiment, the voice receiver 302 may generate the interrupt signal 206 immediately when the voice receiver 302 receives a conversation 304.

In some embodiments, the interrupt signal 206 is generated when a switch button on the case of the phone is pressed. In these cases, the switching of the user interface is controlled by the user. The switch button may be a specially designed button on the case of the phone, or may be any of the conventional buttons on the case of the phone.

The invention may disable a touch function of the touch panel 202 when the voice receiver 302 receives conversation 304. Thus, the invention can avoid the touch panel 202 from being accidentally touched during a conversation.

Figure 4:
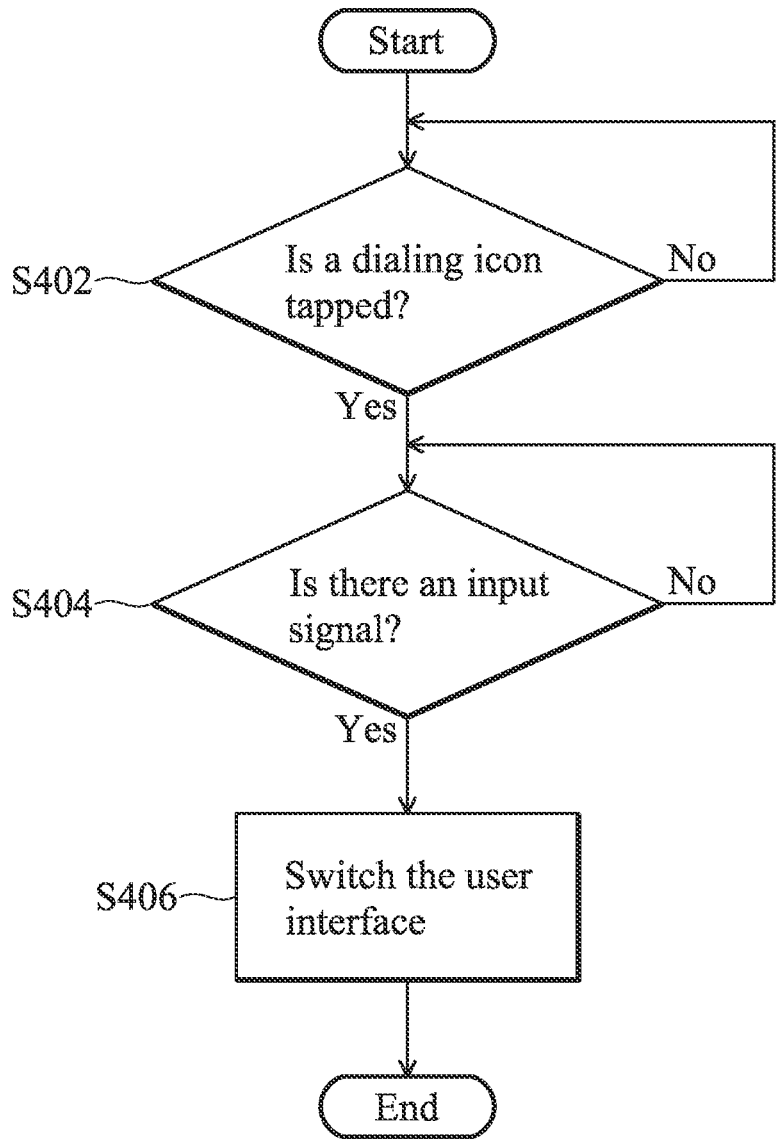
FIG. 4 is a flowchart illustrating an embodiment of the method of the invention.

The invention further discloses methods for controlling a touch panel of a phone. FIG. 4 is a flowchart of the invention. In the flowchart, the touch panel is initially controlled to display a first user interface comprising numeric icons and a dialing icon for the user to dial a phone number. Step S402 detects whether the dialing icon is tapped by the user. If the dialing icon is tapped, the method enters step S404 to detect an interrupt signal. When the interrupt signal is detected, the method enters step S406 to switch the touch panel from the first user interface to a second user interface. The second user interface may comprise icons controlling the functions of the phone, such as adjusting the speaker volume or holding the call.

The interrupt signal may be generated by several ways. In some embodiments, the interrupt signal is generated when a voice receiver of the phone receives a predetermined phrase such as 'hello' or 'may I speak with' or any other phrases. In some embodiments, the interrupt signal is generated once a conversation from the user is detected. In some embodiments, the interrupt signal is generated after a conversation has been detected for a period of time. In some embodiments, the interrupt signal is generated when a switch button on the case is touched, wherein the switch button may be a specially designed button or one of the conventional buttons on the case of the phone.

The method of the invention may further disable a touch function of the touch panel when the voice receiver receives a conversation.

The phones of the invention may be indoor phones or mobile phones or any phones with touch panels.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A phone, comprising:
   a touch panel;
   a voice receiver; and
   a controller, coupled to the touch panel and the voice receiver, and operable to disable a touch function of the touch panel when the voice receiver detects a conversation from a user of the phone, wherein the conversation is detected after a call is established.

2. The phone as claimed in claim 1, wherein a predetermined phrase is detected in the conversation.

3. The phone as claimed in claim 1, wherein the touch function of the touch panel is disabled after the conversation has been detected for a period of time.

4. The phone as claimed in claim 1, wherein the touch function of the touch panel is disabled immediately when the conversation is detected.

5. A phone, comprising:
   a touch panel; and
   a controller, operable to display a first user interface comprising a plurality of numerical icons with a dialing icon on the touch panel for dialing a call, and to maintain displaying the numerical icons and maintain the numerical icons touch-enabled after the call is dialed.

6. The phone as claimed in claim 5, wherein the numerical icons are further maintained after the call is connected.

7. The phone as claimed in claim 5, wherein the controller further detects an interrupt signal after the call is dialed.

8. The phone as claimed in claim 7, wherein the controller further switches the touch panel from the first user interface to a second user interface when detecting the interrupt signal.

9. The phone as claimed in claim 8, further comprising a voice receiver operable to trigger the interrupt signal when receiving a predetermined phrase.

10. The phone as claimed in claim 8, wherein the interrupt signal is generated when a predetermined button of the first user interface is tapped.

11. The phone as claimed in claim 8, further comprising a switch button operable to trigger the interrupt signal when being pressed.

12. The phone as claimed in claim 8, further comprising a voice receiver operable to trigger the interrupt signal after a conversation has been received by the voice receiver for a period of time.

13. The phone as claimed in claim 8, further comprising a voice receiver operable to trigger the interrupt signal when receiving a conversation.

14. The phone as claimed in claim 8, further comprising a voice receiver coupled to the controller, wherein the controller is further operable to disable a touch function of the touch panel when the voice receiver receives a conversation.

15. A method for controlling a touch panel of a phone, comprising:
    controlling the touch panel to display a first user interface on the touch panel, wherein the first user interface includes a plurality of numerical icons and a dialing icon for dialing a call; and
    controlling the touch panel to maintain displaying the numerical icons and maintain the numerical icons touch-enabled after the dialing icon is tapped.

16. The method as claimed in claim 15, wherein the numerical icons are further maintained after the call is connected.

17. The method as claimed in claim 15, further comprising detecting an interrupt signal after the dialing icon of the first user interface is tapped.

18. The method as claimed in claim 17, further comprising switching the touch panel from the first user interface to a second user interface when detecting the interrupt signal.

19. The method as claimed in claim 18, wherein the interrupt signal is generated when a voice receiver of the phone receives a predetermined phrase.

20. The method as claimed in claim 18, wherein the interrupt signal is generated when a predetermined button of the first user interface is tapped.

21. The method as claimed in claim 18, wherein the interrupt signal is generated when a switch button of the phone is pressed.

22. The method as claimed in claim 18, wherein the interrupt signal is generated after a conversation has been detected by a voice receiver of the phone for a period of time.

23. The method as claimed in claim 18, wherein the interrupt signal is generated when a voice receiver of the phone receives a conversation.

24. The method as claimed in claim 18, further comprising disabling a touch function of the touch panel when a voice receiver of the phone receives a conversation.

25. A device, comprising:
a touch panel; and
a controller, operable to display a first user interface on the touch panel with a dialing icon for dialing a call, and cease displaying the first user interface once the call is established and after the call is dialed.

26. The device as claimed in claim 25, wherein the first interface is switched to a second user interface after the call is established.

27. The device as claimed in claim 26, wherein the first user interface is switched to the second user interface according to an interrupt signal.

28. The device as claimed in claim 27, wherein the interrupt signal is triggered after a conversation is detected by the device for a period of time.

29. The device as claimed in claim 27, wherein the interrupt signal is triggered after a predetermined button of the first user interface is tapped.

30. The device as claimed in claim 27, wherein the interrupt signal is triggered after a switch button of the device is pressed.

31. A device, comprising:
a touch panel;
a voice receiver; and
a controller, coupled to the touch panel and the voice receiver, and operable to disable a touch function of the touch panel when the voice receiver detects a voice signal.

32. The device as claimed in claim 31, wherein the call is established according to an interrupt signal.

33. The device as claimed in claim 32, wherein the interrupt signal is triggered when the voice signal is detected by the voice receiver.

34. The device as claimed in claim 33, wherein the voice signal comprises predetermined phrases.

35. The device as claimed in claim 32, wherein the interrupt signal is triggered after the voice signal is detected by the voice receiver for a period of time.

\* \* \* \* \*